United States Patent
Feigel et al.

[19]

[11] Patent Number: 5,806,939
[45] Date of Patent: Sep. 15, 1998

[54] BRAKE SYSTEM WITH ELECTRONIC ANTI-LOCK CONTROL

[75] Inventors: Hans-Jorg Feigel, Rosbach; Gunther Buschmann, Idstein, both of Germany

[73] Assignee: ITT Automotive Europe GmbH, Frankfurt, Germany

[21] Appl. No.: 628,652

[22] PCT Filed: Oct. 6, 1994

[86] PCT No.: PCT/EP94/03300

§ 371 Date: Jun. 20, 1996

§ 102(e) Date: Jun. 20, 1996

[87] PCT Pub. No.: WO95/10435

PCT Pub. Date: Apr. 20, 1995

[30] Foreign Application Priority Data

Oct. 13, 1993 [DE] Germany .......................... 43 34 838.6

[51] Int. Cl.⁶ .............................. B60T 8/26; B60T 8/34; B60T 8/42

[52] U.S. Cl. .................................. 303/166; 303/DIG. 11; 303/115.1; 303/119.1; 303/DIG. 4; 303/113.5

[58] Field of Search .............................. 303/187, 115.4, 303/115.5, 115.1, 113.5, 116.1, 116.2, 119.1, 113.2, 113.3, DIG. 1, DIG. 2, 117.1, 87, 84.1, 84.2, 116.4, 115.2, 68, 900, 901, 113.1, DIG. 3, DIG. 4, 166, DIG. 10, DIG. 11

[56] References Cited

U.S. PATENT DOCUMENTS

| | | | |
|---|---|---|---|
| 3,980,346 | 9/1976 | Leiber | 303/115.4 |
| 4,153,307 | 5/1979 | Goebels | 303/119.1 |
| 4,421,361 | 12/1983 | Arikawa et al. | 303/115.4 |

(List continued on next page.)

FOREIGN PATENT DOCUMENTS

| | | |
|---|---|---|
| 2176105 | 10/1973 | France . |
| 3109372 | 9/1982 | Germany . |
| 3723875 | 2/1989 | Germany . |
| 3929008 | 3/1991 | Germany ................... 303/901 |
| 3931307 | 3/1991 | Germany . |
| 3941241 | 6/1991 | Germany . |
| 4104068 | 8/1992 | Germany . |
| 4136108 | 5/1993 | Germany . |
| 4136109 | 5/1993 | Germany . |
| 4202388 | 8/1993 | Germany . |
| 4218402 | 12/1993 | Germany . |
| 472988 | 5/1969 | Switzerland . |
| 1108123 | 4/1968 | United Kingdom . |
| 1187443 | 4/1970 | United Kingdom . |
| 2205910 | 12/1988 | United Kingdom . |
| 2255809 | 11/1992 | United Kingdom . |

OTHER PUBLICATIONS

English Translation of International Preliminary Examination Report for Application PCT/EP94/03300.

Search Report of the German Patent Office for Application No. P4334838.6.

*Primary Examiner*—Douglas C. Butler
*Attorney, Agent, or Firm*—J. Gordon Lewis; Thomas N. Twomey

[57] ABSTRACT

A hydraulic bake system with electronic anti-lock control includes a multi-circuit braking pressure generator, electrically operable hydraulic valves, low-pressure accumulators which accumulate the pressure fluid that is withdrawn from the wheel brakes in the period of braking pressure reduction wheel sensors, and circuits are used to evaluate the sensor signals and to generate braking pressure control signals. The braking pressure in each wheel is controlled individually by the hydraulic valves. The filling ratio of the low-pressure accumulators or the residual volume is constantly determined and the pressure fluid discharge to the low-pressure accumulators is modified in the course of a control operation as a function of the length of the control and the filling ratio. Initially, there are no restrictions on the anti-lock function, while the rate of fluid flow is drastically reducted in the course of control.

8 Claims, 1 Drawing Sheet

U.S. PATENT DOCUMENTS

| | | | |
|---|---|---|---|
| 4,600,244 | 7/1986 | Leiber | 303/187 |
| 4,657,310 | 4/1987 | Klein | 303/119.1 |
| 4,720,151 | 1/1988 | Belart et al. | 303/68 |
| 4,743,076 | 5/1988 | Davis et al. | 303/119.1 |
| 4,799,048 | 1/1989 | Goshima et al. | 303/115.1 |
| 4,976,501 | 12/1990 | Sivulka et al. | 303/113.5 |
| 4,989,924 | 2/1991 | Toda et al. | 303/113.1 |
| 5,033,800 | 7/1991 | Willmann | 303/116.1 |
| 5,039,175 | 8/1991 | Holzmann et al. | 303/115.4 |
| 5,152,586 | 10/1992 | Burgdorf | 303/113.2 |
| 5,178,442 | 1/1993 | Toda et al. | 303/901 |
| 5,271,667 | 12/1993 | Takata et al. | 303/119.1 |
| 5,281,012 | 1/1994 | Binder et al. | 303/113.5 |
| 5,288,142 | 2/1994 | Burgdorf | 303/113.2 |
| 5,290,098 | 3/1994 | Burgdorf et al. | 303/113.2 |
| 5,385,395 | 1/1995 | Volz | 303/116.1 |
| 5,417,483 | 5/1995 | Sigl | 303/113.5 |

BRAKE SYSTEM WITH ELECTRONIC ANTI-LOCK CONTROL

TECHNICAL FIELD

The present invention relates to vehicle broken and more particularly, related to a hydraulic brake system with electronic anti-lock control, including a pedal-operated multi-circuit braking pressure generator, electrically operable hydraulic valves which are inserted in pressure fluid conduits, and low-pressure accumulators which take up the pressure fluid that is withdrawn from the wheel brakes in the periods of braking pressure reduction and return the pressure fluid to the braking pressure generator after brake release.

BACKGROUND OF THE INVENTION

A brake system of this type is disclosed in German published patent application No. 31 09 372. In this prior art brake system, a hydraulic pump for the return delivery of the pressure fluid withdrawn from the wheel brakes in the periods of braking pressure reduction is eliminated to reduce manufacturing costs. Instead, the pressure fluid withdrawn by way of outlet valves is received in a low-pressure accumulator. After brake release, the pressure fluid flows back into the brake circuits. There are two brake circuits with a diagonal brake circuit arrangement. Each brake circuit has a common inlet and outlet valve assembly and, in addition, another electrically commutatable inlet valve which is inserted in the pressure fluid conduit leading to the rear-wheel brake. The inlet valve is shiftable to its closed condition in response to the anti-lock control, on the one hand, and load-responsively, on the other hand.

The control quality in this known system is rather poor. When any one of the four vehicle wheels starts to lock, both valves leading to the rear wheels are switched to close simultaneously. The objective is that at least one rear wheel remains stable. As soon as a second wheel shows a locking tendency, the braking pressure in one of the two circuits is decreased and subsequently kept constant in addition to continuously shutting off the rear wheels. Assuming that road conditions remain constant, this switched condition will not be changed until the termination of the braking operation. For safety reasons, the hydraulic pressure in only one of the two diagonal brake circuits is reduced at the same time. This type of control is rather primitive because it temporarily admits locking of the wheels or the application of too low braking forces to the wheels.

An object of the present invention is to provide a brake system with anti-lock control which, equally, does not require a hydraulic energy source and whose function, nevertheless, is not inferior to the function of a "complete" ABS in the majority of situations, above all in critical situations. The objective is that driving stability is maintained and fail-safety of the braking function is not limited.

It has been found that this object can be achieved by the present invention which involves the provision of two hydraulically isolated brake circuits in a diagonal brake circuit arrangement and one low-pressure accumulator per brake circuit which has two separate inlets for the connection of the rear wheel and the front wheel and is designed so that the pressure fluid flow from the front-wheel brake is shut off when a predetermined filling ratio or residual volume in the accumulator is reached.

The present invention is based on the recognition that, principally, the duration of a braking operation with anti-lock control is limited to a short time period and that the condition actually critical with respect to driving dynamics is present only at the commencement of braking. The driving condition becomes less critical with the growing duration of braking and at a reduced speed of the vehicle. When braking during cornering, the translational force required decreases as the driving speed is reduced. Steering maneuvers should be possible above all shortly after braking with anti-lock control is initiated to avoid an obstacle early.

Also, in the majority of cases, conditions change shortly after the commencement of a controlled braking operation so that a maximum deceleration is not necessary. The braking operation is terminated with the vehicle still moving, or the deceleration is decreased at least to such an extent that the coefficient of friction required is not in excess of the coefficient of friction present between tires and road surface. In other situations, the vehicle comes to a stop after a short time. The duration of a controlled braking operation depends on the initial speed and the coefficient of friction between tires and road surface.

It follows from these conditions that the requirements set to the anti-lock control function may be reduced with a growing duration of braking. The present invention uses this advantage.

The use of a low-pressure accumulator with a two-stage chamber according to the present invention, i.e., with separate inlets for the front wheel and the rear wheel of the diagonal, a "safety volume" of the accumulator is automatically available in all situations to control the braking pressure in the rear-wheel brakes. This is of decisive importance to preserve the driving stability in critical situations. In the worst case, which is assumed to have a theoretical rather than a practical implication, the front wheels might tend to lock. An excessive loss in braking effect, i.e., an excessive braking pressure reduction, cannot occur.

According to a favorable aspect of the present invention, two hydraulically isolated brake circuits with a diagonal brake circuit arrangement are provided. The wheel brake of each wheel is connected by way of a separate valve assembly including two two-way/two-position directional control valves, serving as inlet and outlet valves, or one three-way/three-position directional control valve. The two outlet valves of a brake circuit or the outlet valve conduits lead to a common low-pressure accumulator. Further, it is possible to connect the low-pressure accumulator to the associated brake circuit additionally by way of a non-return valve which opens towards the braking pressure generator. The low-pressure accumulator may evacuate through this non-return valve after brake release.

The filling ratio in the low-pressure accumulator or the residual volume is favorably determined by measuring and evaluating the quantities which define the supply flow of pressure fluid to the low-pressure accumulator. The valve operating times, the braking pressure is evaluated in consideration of the characteristic curves of the system.

In another embodiment of the brake system according to the present invention, the low-pressure accumulator has a piston which is movable in opposition to the pressure of a spring during volume absorption. The position and travel of the piston is determined by a travel sensor. Favorably, the piston of the low-pressure accumulator is connected in this case to a valve member which shuts off the supply flow of pressure fluid.

In another embodiment of the present invention, one low-pressure accumulator is provided for each brake circuit of a diagonal brake circuit arrangement. The low-pressure accumulator has two separate inlets for the connection of the rear wheel and the front wheel and is designed so that the pressure fluid flow from the front-wheel brake to the accumulator is shut off when a predetermined filling ratio in the accumulator is reached. The "safety volume" of the accumulator is then available for the control of the braking pressure on the rear wheel. This arrangement is useful in some braking situations to preserve the driving stability.

The filling ratio in the low-pressure accumulator or the residual volume is favorably determined by measuring and evaluating the quantities which define the supply flow of pressure fluid to the low-pressure accumulator. The valve operating times, the braking pressure, or a quantity indirectly representative of the braking pressure is evaluated in consideration of the characteristic curves of the system.

In another embodiment of the brake system according to the present invention, the low-pressure accumulator has a piston which is movable in opposition to the pressure of a spring during volume absorption. The position and travel of the piston is determined by a travel sensor. Favorably, the piston of the low-pressure accumulator is connected in this case to a valve member which shuts off the supply flow of pressure fluid from the front-wheel brake to the low-pressure accumulator as soon as the piston reaches a position which corresponds to a predetermined filling ratio.

Further, circuits or circuit stages may be provided by the present invention which limit the pressure fluid discharge into the low-pressure accumulator after the commencement of an anti-lock control operation by applying one or a plurality of the following provisions:

reduction of the control frequency with growing duration of anti-lock control, adjustment of an approximately constant rear-axle pressure, rise of the wheel slip control thresholds on any one or more of the wheels in response to road conditions, reduction of the control function on the front wheels with decreasing vehicle speed.

This way, the pressure fluid discharge from the wheel brakes can be effectively reduced in the course of a control operation without limiting the function of the controlled braking operation.

Further, according to a preferred aspect of the present invention, the hydraulic valves are flow-controlled multiway valves causing a predetermined pressure variation as a function of their operation.

In still another embodiment of the present invention, the control strategy or control philosophy is modified in several steps in response to the filling ratio of the low-pressure accumulator and/or the duration of the anti-lock control, and for that matter, starting from an unrestricted anti-lock function to a type of control with a lower rate of pressure fluid flow.

Further features, advantages and possible applications of the present invention will be understood from the following description of embodiments with reference to the accompanying drawings.

DETAILED DESCRIPTION OF THE PREFERRED EMBODIMENTS

Figure 1:
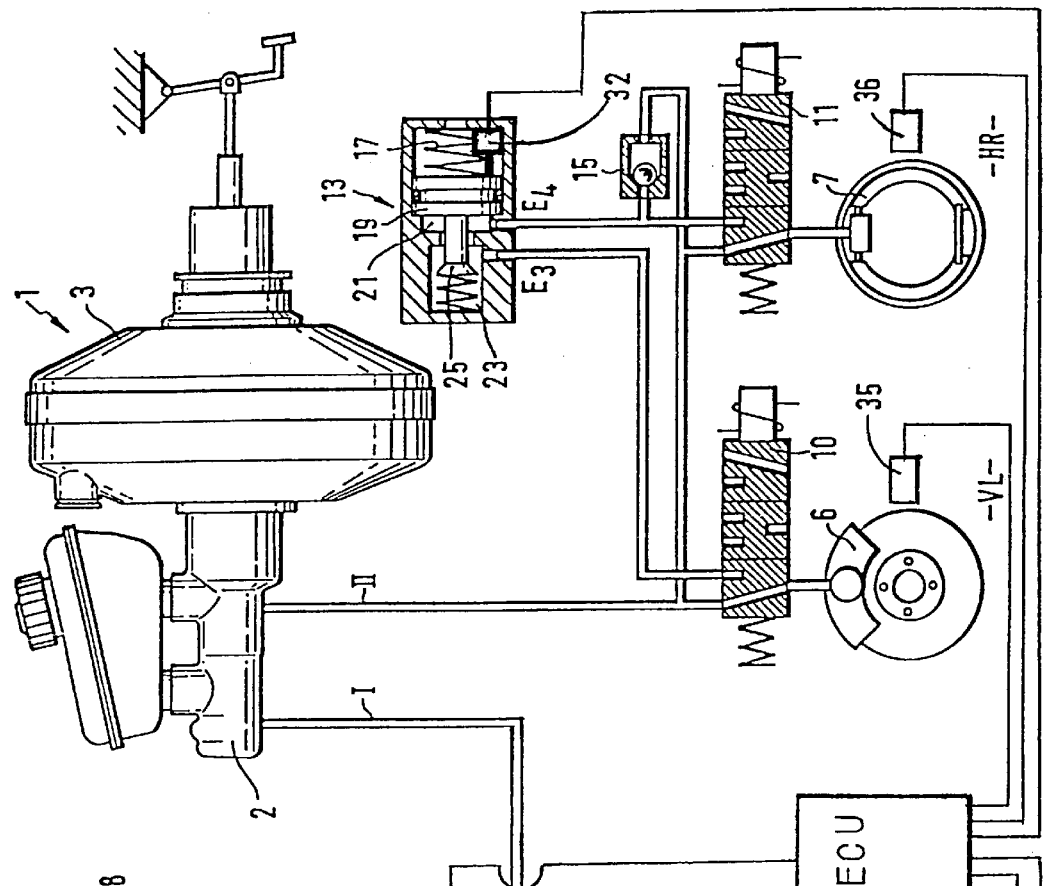
FIG. 1 is a diagrammatic view of the main hydraulic components of a brake system according to the present invention.

The brake system of the present invention in FIG. 1 mainly includes a pedal-operated braking pressure generator 1 which has a tandem master cylinder 2 preceded by a vacuum booster 3. The wheel brakes 4–7 of the vehicle wheels are connected in a diagonal brakecircuit arrangement to the braking pressure generator 1 by way of two hydraulically isolated brake circuits I, II. The wheel brakes of the right front wheel VR and the left rear wheel HL are connected to the brake circuit I, and the wheel brakes of the other two wheels VL, HR are connected to the brake circuit II. In the present embodiment, an electrically controllable three-way/three-position directional control valve 8–11 is arranged in each of the pressure fluid conduits to the wheel brakes. Each brake circuit I, II has a low-pressure accumulator 12, 13. The return conduits of the three-way/three-position directional control valves 8–11 lead to the low-pressure accumulator after the valves have adopted the corresponding position.

Low-pressure accumulators 12, 13 have hydraulically isolated inlets $E_1$, $E_2$ and $E_3$, $E_4$, respectively, for the separate connection of the front wheels and the rear wheels. Finally, a return conduit protected by a non-return valve 14, 15 is provided to connect the respective low-pressure accumulator 12 or 13 to the brake circuit I or II. After brake release, the pressure fluid in the low-pressure accumulators 12 or 13 flows back to the brake circuits I, II or to the master cylinder 2 through the return conduit.

The electrical components of the brake system are only shown insofar as it is useful for understanding the invention. Each wheel VR, HL, VL, HR has a wheel sensor (not shown) which produces electric signals representative of the wheel rotational behavior. The sensor signals are evaluated in an electronic control circuit ECU to produce braking pressure control signals required for the control. The braking pressure control signals drive the electromagnetically operable three-way/three-position directional control valves 8–11 for braking pressure control or anti-lock control.

The low-pressure accumulators 12, 13 of the brake system of FIG. 1 have a piston 18, 19 which is movable in opposition to the force of a spring 16, 17. Piston 18, 19 defines an accumulator chamber 20, 21. The rear-wheel brakes 5, 7 are directly connected to the accumulator chamber 20, 21 in the braking pressure reduction period through inlet $E_2$, $E_4$ of the accumulator 12, 13. In contrast thereto, connection $E_1$, $E_3$ of the front-wheel brake 4, 6 terminates into the accumulator chamber 20, 21 through a chamber 22, 23. Chamber 22, 23 is closed by a valve member 24, 25 as soon as a predetermined filling ratio in accumulator chamber 20, 21 and low-pressure accumulator 12, 13 is reached. Depending on the type of design of the brake system and the predefined safety requirements, the filling ratio may adopt a value ranging between 60 and 90%, preferably ranging between 70 and 85%. Upon attainment of a predefined filling ratio, in the pressure reduction period, i.e. after change-over of the three-way/three-position directional control valves to their third position, discharge of pressure fluid is only permitted through the outlet conduit of the respective valve 9, 11. Thus, pressure reduction is possible on the rear wheels HL, HR only. The pressure in the wheel brakes 4, 6 of the front wheels VR, VL, however, is maintained constant in this period. The filling condition of the low-pressure accumulator 12, 13 can principally be determined by measuring and evaluating the valve operating times in consideration of the characteristic curves of the valves and the accumulator. When generating such a "volume pattern", favorably, the braking pressure prevailing in the brake circuits I, II during the control is also taken into account. This braking pressure can be measured by pressure sensors or determined by evaluating the vehicle deceleration present at the onset of the control, or by other known criteria, in a known manner. Of course, it is also possible to measure the travel and the position of the piston 18, 19 of the accumulator 12, 13, which is axially movable during volume absorption and discharge, by way of a travel sensor (31, 32) in order to achieve a measure for the filling ratio of the accumulator 12, 13. The necessary expenditure in manufacture and the accuracy requirements set for determining the filling ratio finally dictates which of the aforementioned measures is applied.

Figure 2:
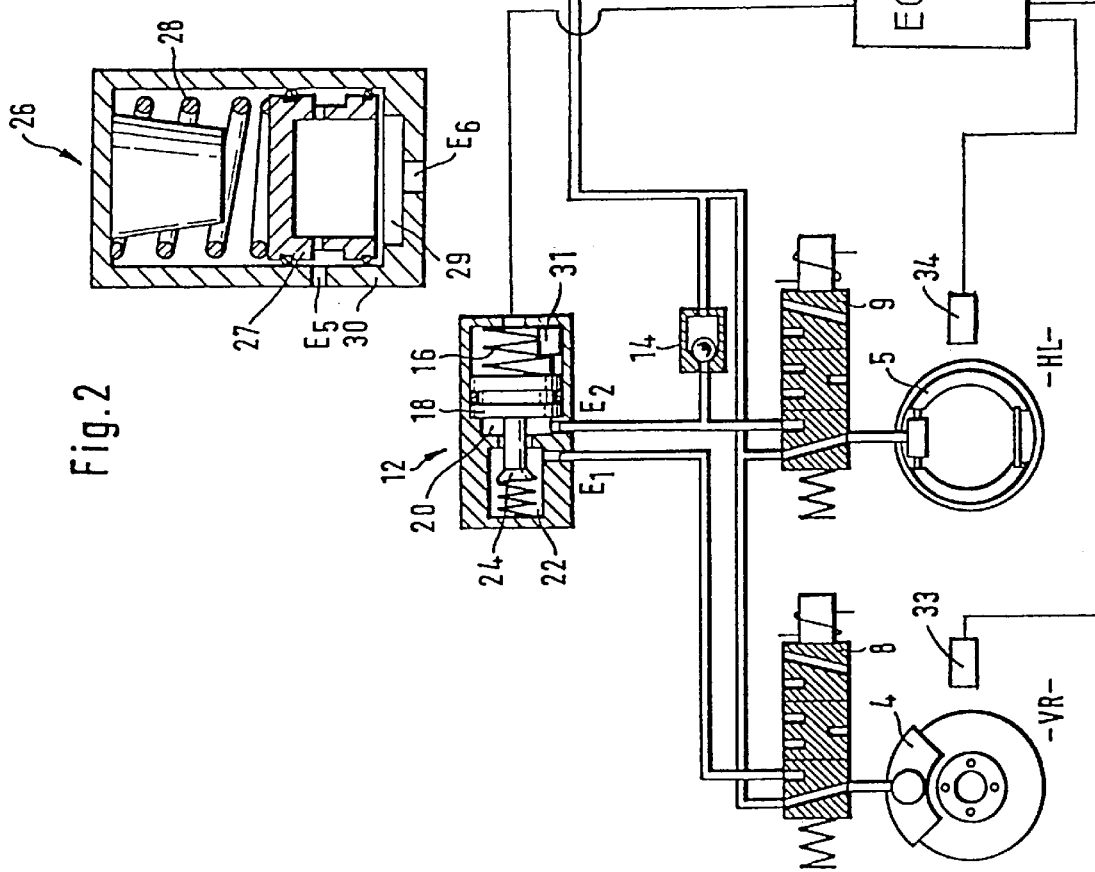
FIG. 2 is a cross-sectional view and functional diagram of another embodiment of a low-pressure accumulator of the brake system of the present invention.

FIG. 2 shows a functional diagram of a low-pressure accumulator 26 which can be used instead of the accumulators 12, 13 for the brake system of FIG. 1. In FIG. 2, the connection for the wheel brake of the front wheel is identified by $E_5$ and for the wheel brake of the rear wheel by $E_6$. The piston 27, which is axially movable as a function of the filling ratio of the low-pressure accumulator 26, has a cup-shaped design. A resetting spring 28 which corresponds to the spring 16 (17) of the described accumulator 12 (13) makes catch at the cup bottom. The accumulator chamber 29 and the interior of the piston 27 are connected to the connection $E_5$ for the front-wheel brake through an opening in the wall of the piston 27 and in the housing wall 30 of the accumulator 26. Connection $E_5$, however, is open only until the piston 27, which is axially displaced by the volume absorption, has adopted a position where its wall closes the connection $E_5$. After this threshold value has been exceeded, the remnant accumulator volume is available only for the take-up of pressure fluid through inlet $E_6$ which is connected to the wheel brake of the rear wheel in the pressure reduction period. The accumulator 26 differs from the low-pressure accumulators 12, 13 in FIG. 1 only in its structure, but not in its function.

The operation of the brake system of the present invention is as follows:

Before anti-lock control commences, the valves 8–11 assume their positions shown in FIG. 1, where unimpeded braking pressure increase and reduction is possible through the inlet conduits of the valves. Initially, the low-pressure accumulators 12, 13, 26 are empty. When the control is started, the three-way/three-position directional control valve which is associated with the wheel that became unstable is operated. In an intermediate switch position of the valves 8–11, further pressure increase is interrupted, while pressure reduction is permitted through the outlet conduit of the corresponding valves 8–11 in a third switch position. The pressure variation in the wheel brakes 4–7 is determined in a known fashion by rating the valve operating times. After release of the brake 1, i.e., release of the brake pedal, the pressure fluid received by the low-pressure accumulators 12, 13 flows back to the master cylinder 2 through the non-return valves 14, 15 under the effect of the resetting springs 16, 17.

At the commencement of a controlled braking operation, the operation of the brake system according to the present invention is identical with a "complete" ABS, i.e., an anti-lock system equipped with a recirculating pump. There is no difference for the entire braking operation compared to the function of a complete ABS in the presence of a high coefficient of friction and in other control situations with a low "pressure reduction requirement". The control must account for the limited accumulator volume of the low-pressure accumulators 12, 13, 26 in controlled braking operations with a high pressure reduction requirement. Therefore, the "rate of fluid flow" is drastically reduced in the course of the control by modification of the control. Deceleration of the pressure re-increase in the course of the control and an extended period of maintaining the pressure constant causes reduction of the control frequency. Especially for homogeneous road conditions, this will not limit the controlled braking or extend the stopping distance greatly.

In addition, similar to an electronic brake force distribution, the control can be rated such that the braking pressure in the rear-wheel brakes is maintained constant proximate the optimum coefficient of friction for the duration of the braking operation.

It is further possible, with increasing duration of the control, to raise the slip thresholds of the wheels in response to the instantaneous translational force requirement, for example, in the presence of $\mu$-split, the slip threshold for the wheel on the side with a low friction value. Thus, pressure reduction commences only upon attainment of a higher amount of slip. Driving stability is ensured in this situation by maintaining the control on the diagonally associated rear wheel.

Another measure of reducing the rate of fluid flow involves reducing the control function on the front axle with decreasing driving speed. Possibly, steerability will be reduced slightly in the lower speed range, but driving stability is maintained to full extent.

Further provisions for reducing the rate of fluid flow or the pressure reduction requirement in response to the respective driving situation are possible and may be achieved by a corresponding design or programming of the controller. Driving stability has priority in all the provisions. Under certain circumstances, transition to a high amount of slip or even a short locking is tolerable without major limitation of the control quality in specific situations.

The brake system described includes low-pressure accumulators with separate inlets for the connection of the rear-wheel brakes and front-wheel brakes. The special feature in this embodiment is that the connection of the accumulator to the return valve conduit of the front wheel is shut off in response to the filling ratio of the low-pressure accumulator. When this predetermined limit value of filling of the low-pressure accumulator is reached and exceeded, further pressure reduction is not possible in the front-wheel brake. However, pressure reduction is still possible in the rear-wheel brake until the low-pressure accumulator is completely filled. In this case, the control is adapted to this special arrangement and modified such that driving stability is ensured without using up the free residual volume available in the low-pressure accumulator for pressure reduction before the vehicle comes to a stop. Thus, a safety reserve exists.

According to the present invention, the need for hydraulic pumps is eliminated, without a major limitation of the control, by use of the low-pressure accumulators and, additionally, by an "economical" handling of pressure reduction and by modification of the control method or control strategy in response to the duration of the control and the filling ratio of the low-pressure accumulators. At the commencement of control, as long as a sufficiently large residual volume for the discharge of brake fluid from the wheel brakes into the low-pressure accumulators is available, there are no limitations in the anti-lock function compared to an anti-lock system with energy supply ("complete" ABS). As soon as the limit values of the filling ratio are exceeded, the control is modified with the objective of achieving a minimum pressure fluid discharge through the valve outlet conduits.

In principle, the filling ratio of the accumulators and the exceeding of determined limit values can be achieved by generating a volume pattern in the system logic, travel-controlled valves in the low-pressure accumulator and/or travel sensors in the low-pressure accumulator.

For the volume pattern generation, the wheel pressure, the volume absorption of the wheel brakes, the pressure reduction gradients, the operating times of the valves and the characteristic curves of the system and the accumulators are evaluated, the characteristic curves being predefined by the geometrical shape. The travel-controlled valves cause automatic interruption of the further pressure reduction in the front wheels as a function of the filling pressure of the low-pressure accumulator. Reduction of the translational force or even wheel lock in an advanced phase of the control is tolerable, if necessary.

We claim:

1. An automotive vehicle brake system with electronic anti-lock control including a plurality of front wheel brakes and a plurality of rear wheel brakes, a pedal-operated multi-circuit braking pressure generator, electrically operable hydraulic valves which are designed and inserted in pressure fluid conduits so that the braking pressure in each of the front and rear wheel brakes is controllable individually, wherein sensors and/or circuits are provided serving to constantly determine instantaneous contents of low-pressure accumulators, wherein pressure fluid discharge from the wheel brakes to the low-pressure accumulators is reduced in the course of a control operation by modification of the control, comprising:

two hydraulically isolated brake circuits in a diagonal brake circuit arrangement having one low-pressure accumulator respectively associated with each said brake circuit, wherein each accumulator includes an accumulator chamber and two separate inlets;

wherein one of said two inlets from each accumulator is connected to a respective one of the rear wheel brakes and permanently connected to the accumulator chamber and the other one of said two inlets from each accumulator is connected to a respective one of the front wheel brakes and to the accumulator chamber via an internal valve for shutting off pressure fluid flow from the respective front wheel brake to the accumulator chamber when a predetermined filling ratio in the respectively associated accumulator chamber is reached to reserve a residual volume for further pressure fluid discharge from the respective rear wheel brake to the accumulator chamber.

2. A brake system as claimed in claim 1 herein each of the hydraulic valves is connected to a respective one of the wheel brakes, and wherein each of the hydraulic valves comprise two two-way/two-position directional control valves.

3. A brake system as claimed in claim 2, wherein the low-pressure accumulators are connected to the associated brake circuit by way of a non-return valve which opens towards the braking pressure generator.

4. A brake system as claimed in claim 1, wherein the predetermined filling ration in the low-pressure-accumulator is determined in approximation by measuring and evaluating a representative characteristic of the pressure fluid discharge to the low-pressure accumulator.

5. A brake system as claimed in claim 4, wherein the predetermined filling ratio is determined by evaluating operating times of the hydraulic valves and a representative characteristic of the braking pressure.

6. A brake system as claimed in claim 1, wherein the low-pressure accumulator includes a piston which is movable in opposition to a spring, and the position and travel of the piston is sensed by a position sensor.

7. A brake system as claimed in claim 1, further comprising circuits adapted to limit the pressure fluid discharge to the low-pressure accumulator after the commencement of an anti-lock control operation and adapted to use at least one of the following provisions:

reducing the control frequency with increasing duration of anti-lock control, adjusting an approximately constant rear wheel brake pressure, raising wheel slip control thresholds on any one or more of the wheel brakes in response to variations in road conditions, reducing control of the front wheels with decreasing vehicle speed.

8. A brake system as claimed in claim 7, including an electronic control unit capable of modifying the control operation in response to the filling ratio of the low-pressure accumulators and the duration of the anti-lock control operation.

* * * * *